United States Patent [19]

Wolf et al.

[11] 3,928,298

[45] Dec. 23, 1975

[54] POLYETHERS CONTAINING HYDANTOIN RINGS AS ANTISTATIC AGENTS FOR SYNTHETIC FIBERS AND FOILS

[75] Inventors: Gerhard Dieter Wolf, Dormagen; Helmut Engelhard, Leverkusen; Francis Bentz, Cologne, all of Germany

[73] Assignee: Bayer Aktiengesellschaft, Leverkusen-Bayerwerk, Germany

[22] Filed: Sept. 14, 1973

[21] Appl. No.: 397,419

[30] Foreign Application Priority Data
Sept. 15, 1975 Germany............................ 2245335

[52] U.S. Cl..... 260/88.7 B; 260/78 S; 260/85.5 ES; 260/85.5 S; 260/79.3 M; 260/85.5 B; 260/85.5 XA; 260/92.8 A; 260/93.5 A; 260/94.9 GD; 260/DIG. 17; 260/DIG. 19; 260/309.5

[51] Int. Cl.²....................................... C08F 122/30

[58] Field of Search......... 260/78 S, 88.7 R, 88.7 B, 260/DIG. 17, DIG. 19

[56] References Cited
UNITED STATES PATENTS

| | | | |
|---|---|---|---|
| 3,728,305 | 4/1973 | Wells................................. | 260/78 S |
| 3,755,497 | 8/1973 | Weedon et al...................... | 260/860 |

*Primary Examiner*—Harold D. Anderson
*Attorney, Agent, or Firm*—Plumley & Tyner

[57] ABSTRACT

This invention relates to synthetic fibres, threads and foils of polymer with permanent antistatic properties which contain 0.5 to 15 percent by weight of polyethers containing hydantoin rings. Polyethers containing hydantoin rings according to the invention are well compatible with the polymers and well resistant against washing.

8 Claims, No Drawings

POLYETHERS CONTAINING HYDANTOIN RINGS AS ANTISTATIC AGENTS FOR SYNTHETIC FIBERS AND FOILS

This invention relates to synthetic threads, fibres, foils and films with permanent antistatic properties.

Shaped products produced from polymers, e.g. fibres produced from polyacrylonitrile, polypropylene, polyamides or polyesters, generally have the undesirable property of becoming electrically charged, which considerably restricts their range of commercial applications. This unwanted electrostatic charging occurs when the surface resistance of the fibres is more than $10^{12}$ Ohm.

Various measures have already been employed to overcome this disadvantage. It has frequently been attempted to increase the electrical conductivity by a surface treatment with antistatic preparations of the fibres or of the textile products produced from them. It is often found, however, that the antistatic effect thereby obtained is not sufficiently permanent.

According to another method, an antistatic finish is obtained by applying aqueous solutions of suitable agents to fibres which are in an aquagel state (see German Pat. Specifications Nos. 1,469,913 and 1,965,631). The difficulty in this method lies in observing specific operating conditions.

It is also known to mix polyacrylonitrile, for example, with a second acrylonitrile copolymer which contains from 30 to 80 percent by weight of a polyethylene oxide methacrylate and then to spin this mixture (see German Pat. Specification No. 1,645,532). Excessively high proportions of polyethylene oxide, however, cause yellowing of the fibres when exposed to heat or light so that stabilizers must then be used to overcome this disadvantage (see German Offenlegungschrift No. 2,138,839).

Those processes which consist in increasing the electrical conductivity by copolymerising suitable comonomers generally have the disadvantage of substantially altering the characteristic and advantageous properties of polymers which are modified in this way.

Another method frequently employed for reducing the static charge on polymers consists in adding polyethers on other suitable compounds, in most cases compounds which contain polyethers, to the solutions or solvent-free melts of these polymers before they are shaped. It is very difficult, however, to find compounds of this type which are both wash-resistant, i.e. remain in fibres of such polymers even after repeated washing with alkaline detergents, and sufficiently compatible with the polymers mentioned above. Polyethers and many compounds which contain polyether segments have the additional disadvantage of reducing the lightfastness of the polymers to which they are added.

The polyethers according to this invention which contain hydantoin rings combine several advantages within themselves. The hydantoin rings render them highly compatible with the polymers and impair the antistatic property which is very resistant to washing. Thus, for example bis-urethanes prepared from a polyetherdiol (average molecular weight ≈ 1000) and stearylisocyanate have poor compatibility with polyacrylonitrile solutions whereas compounds with a similar structure but, in addition, containing a hydantoin ring in accordance with this invention, have surprisingly good compatibility. Another great advantage of these compounds is that the hydantoins have the effect of ensuring substantially improved lightfastness of the polymers.

This invention therefore relates to synthetic threads, fibres, foils and films with permanent antistatic properties made of polymers obtained by polymerisation, polyaddition or polycondensation, which contain 0.5–15 percent by weight, preferably 1–10 percent by weight, of polyethers which contain one or more hydantoin rings as represented by the following general formulae:

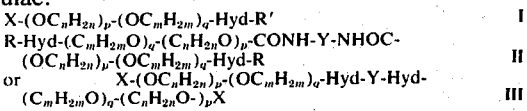

in which X represents hydrogen or a

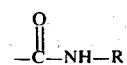

group, Y represents a bivalent $C_2$ to $C_{18}$ hydrocarbon group which may be substituted by halogen, alkyl, $NO_2$ or CN, and Hyd represents a bivalent group of the formula

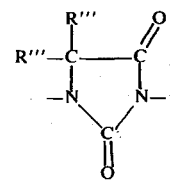

R represents a $C_1$ to $C_{18}$ alkyl, cycloalkyl, aryl, aralkyl or alkaryl group which may be substituted by halogen, alkyl, $NO_2$ or CN, R' may have the same meaning as defined for R or represent the group $-(C_mH_{2m}O)_q-(C_nH_{2n}O)_p-X$, R" and R''' represent a $C_1$ to $C_4$ alkyl or aryl group or together represent a $C_5$ to $C_6$ cycloalkyl group, n and m represent an integer of from 2 to 6 and p and q represent 0 or an integer of from 1 to 50, preferably 5 to 30, and at least one of the two symbols p or q must represent an integer > 0.

The group of polymers should be understood to include in particular polyacrylonitrile or copolymers of acrylonitrile with (meth)-acrylic acid esters, (meth)-acrylamides, N-vinyl lactams, vinyl-, (meth)-allyl esters or ethers, vinyl or vinylidene halides, alkylvinylpyridines, vinylimidazoles, (mono)-dialkylaminoalkylacrylates or methacrylates or their quaternised derivatives, vinyl-, (meth)-allylsulphonic acids, vinyl-, (meth)-allylphosphonic acids or their esters, as well as polyalkylenes, polystyrenes, polyacrylates or methacrylates, polyvinyl or polyvinylidene halides and mixtures of these polymers.

The invention also relates to permanently antistatic threads, fibres, foils and films of polyamides, of the kind described in "Die Polyamide", by H. Hopff, A. Müller, and F. Wenger, Springer Verlag Berlin, Göttingen, Heidelberg, 1954, pages 31, 32 and 153 and in Kunststoff-Handbuch Volume IV, "Polyamide," Carl Hanser Verlag Munchen, 1966, pages 143 and 144. Polyimides may also be suitable polymers for the purpose of this invention, for example those mentioned in German Auslegeschrift No, 1,082,314; French Patent Specification No. 1,283,378; U.S. Pat. Specifications Nos. 3,179,634 and 3,300,420 and British Pat. Specifications Nos. 1,009,956; 1,160,097; 1,168,978 and 1,056,564. Polyesters and polyurethanes, e.g. those mentioned in "Fibres from Synthetic Polymers," Rowland Hill, Elsevier Publishing Company, New York, N.Y., 1953, pages 144–146, may also be used for producing the end products according to the invention.

The polyethers containing hydantoin rings in accordance with the general formula I are prepared by methods known per se, for example by reacting α-aminocarboxylic acid nitriles with alkylisocyanates in inert solvents. The urea derivatives obtained from this reaction may be cyclised in solution or in suspension, preferably with the aid of acid catalyst, e.g. in a mixture of ethanol and concentrated hydrochloric acid, to produce the 3-alkylhydantoins. Polyethoxylation is preferably carried out in the melt after the addition of a basic catalyst such as an alkali metal hydroxide or alkali metal alcoholate, although, in principle, ethoxylation could also be carried out in solution in an inert solvent. Ethoxylation with glycol carbonate, which has already been described in the literature, has also been found to be satisfactory.

Instead of reacting the hydantoins with one alkylene oxide, they may be reacted with a mixture of two or more alkylene oxides. In that case, it is preferred to add the various alkylene oxides successively or periodically so that uniform blocks can be formed.

Since a given alkylene oxide is not incorporated uniformly but statistically distributed, the index p or q in the formulae represents the average degree of polyaddition of alkylene glycol chains of various lengths.

Alkoxylation carried out with ethylene oxide alone is most effective for the purpose of the invention and therefore preferred although, in the case of some compounds, it has been found advantageous to carry out a treatment with propylene oxide prior to ethoxylation.

These polyethers which contain a hydantoin ring may be reacted with a monoisocyanate, an alkyl, cycloalkyl or aryl isocyanate, preferably stearyl isocyanate, in the melt or in solution, to form a urethane group. This procedure is suitable for increasing the wash resistance of the compound if it is to be used as additive for polymers. In general it is found that, for a given degree of ethoxylation, those hydantoins in which the terminal hydroxyl functions are converted to urethane groups have very permanent antistatic properties because of their much higher resistance to washing.

If, instead of reacting the polyether containing a hydantoin ring with a monoisocyanate, it is reacted with a diisocyanate in a molar ratio of 2 mols of monofunctional hydantoin polyether to 1 mol of diisocyanate, then compounds of the general formula II are obtained. The diisocyanates used may be known aliphatic or aromatic diisocyanates, e.g. 4,4-diisocyanatodiphenylmethane or hexamethylene diisocyanate.

To prepare polyethers of the general formula III which contain two hydantoin rings, for example, α-aminocarboxylic acid nitriles are reacted with a diisocyanate such as 4,4-isocyanatodiphenylmethane or hexamethylene diisocyanate in a molar ratio of 2:1, preferably in an inert solvent. The resulting diurea may advantageously be cyclised to the dihydantoin in an acid medium. Various processes are known in the literature but the method of heating in a mixture of ethanol and concentrated hydrochloric acid, for example in proportions of 4:1, has been found to be particularly satisfactory. This bis-hydantoin may be polyalkoxylated at both free NH groups as described above. If desired, the free hydroxyl groups may be masked with isocyanates to increase the hydrophobic character of the molecules as a whole.

Polyethers and polyether urethanes with hydantoin rings prepared as described above are added to the spinning solutions or melts of the polymers in concentrations of 0.5 to 15 percent by weight, preferably 1 to 10 percent by weight, based on the polymers, before the polymers are shaped.

Formation of these threads, fibres, foils or films which have been modified by the additives is carried out by the usual well known processes.

The resistance of the fibres according to the invention, for which figures are given in the examples, was determined by means of a commercial high resistance ohmmeter (manufactured by Knick) by measuring between the plates of two electrodes spaced apart by 1 cm and using a measuring voltage of 100 V, in accordance with DIN 54345. Before each measurement, the fibre material was conditioned for 72 hours in a standard atmosphere of 50 percent relative humidity at 23°C.

Fibres produced according to the invention have an electric surface resistance of between $10^{10}$ and $10^{11}$ Ohm at 50 percent r.H and 23°C. Garments such as suits, skirts, waistcoats or jackets manufactured from these fibres show hardly any signs of electrostatic charging or any of the known phenomena due to electrostatic charging such as sticking of the garments to their hangers, soiling due to attraction of dust, crackling noises due to discharge or electric shocks. The fibres according to the invention can be dyed with the usual dyes without any loss of their excellent antielectrostatic character. The fibres are particularly advantageous for use in fabrics which would otherwise require a subsequent antistatic finishing treatment, for example curtain fabrics. Fibres used in this way are not found to attract dust due to static electricity produced by friction nor can the dust stick to the fibres due to the presence of sticky finishes.

The following examples are to further illustrate the invention without limiting it.

EXAMPLE 1

Preparation and antistatic action of:

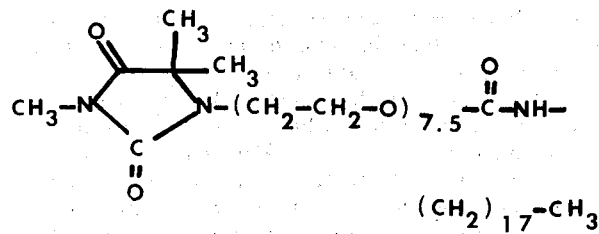

15 parts by weight of an approximately 10 percent methanolic solution of sodium methylate were added to 142 parts by weight of 3,5,5-trimethylhydantoin in a three-necked flask with a stirrer and a distillation condenser attached to it. The mixture was slowly heated with stirring to evaporate the alcohol. The temperature was then raised to 160°–170°C and, after displacement of the remaining air with nitrogen, ethylene oxide was introduced until a weight increase of 330 parts by weight was obtained. The thick yellow oil obtained was pressure filtered to remove a slight cloudiness. The molecular weight was found by determining the hydroxyl number. OH %: 3.7, molecular weight ≈ 460.

100 parts by weight of this polyether were heated to 100°C under nitrogen, 70 parts by weight of stearyl isocyanate were added dropwise over a period of 2 hours and the reaction mixture was then stirred for 2 to 3 hours at 100°C. The reaction product was taken up with 250 parts by volume of dimethylformamide and again filtered to remove a slight insoluble residue. The solids content of the solution was 41 percent by weight.

This solution of 3,5,5-trimethyl-1-polyethylene oxideurethane was used to prepare a solution in dimethylformamide of a mixture of 90 percent by weight of a polyacrylonitrile (K-value 81) and 10 percent by weight of the polyethoxylated urethane. The solution was spun dry at a viscosity of about 260 poises (85°C). The fibres had a tensile strength of 3.9 g/dtex and an elongation of 15 percent.

The antielectrostatic action of the additive was determined by measuring the surface resistance of the fibres at 23°C and 50 percent relative humidity as already mentioned above. Resistance of sample obtained (unbleached: $5 . 10^{10}\Omega$; resistance of sample after 10 washings: $3 . 10^{10}\Omega$.

Since the polyacrylonitrile used in the mixture contained an acid additive, the fibres obtained from the mixture could be dyed to determine whether the antielectrostatic action was lost by dyeing.

The fibres were dyed with the basic dye Astrazonrot GTL (C. J. Basic red, 18, 11 085) by the usual method used for acrylic fibres and the surface resistance was again determined. It was found to be $4 . 10^{10}\Omega$. When the dyed fibres were washed several times and their antielectrostatic properties again determined, the antistatic effect was again found to be permanent, the resistance measured being $5 \times 10^{10}\Omega$.

EXAMPLE 2

Antistatic action of

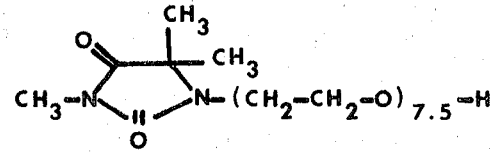

as additive

A mixture of 90 percent by weight of polyacrylonitrile and 10% by weight of the polyethoxylated 3,5,5-trimethylhydantoin described in Example 1 was spun dry. The fibres were found to have the following surface resistances: Fresh fibre: $9 . 10^{9}\Omega$; Fibre after 5 washings: $3 . 10^{11}\Omega$. After the sixth washing, the surface resistance had already increased to $2 . 10^{12}$ and was therefore too high for any antielectrostatic effect.

EXAMPLE 3

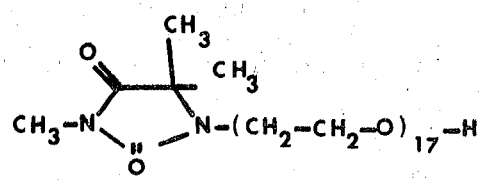

This 3,5,5-trimethyl-hydantoin polyethylene oxide was prepared by the ethoxylation method described in Example 1. Fibres spun from a mixture of 90 percent by weight of polyacrylonitrile and 10 percent by weight of the compound were found to have the properties shown below. Tensile strength: 2.5 g/dtex Elongation: 14 percent Electric surface resistance:
in fresh, unbleached fibre: $9 . 10^{8}\Omega$
after 8 washings: $3 . 10^{11}\Omega$.

EXAMPLE 4

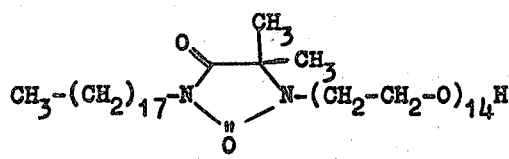

188 parts by weight of 3-stearyl-5,5-dimethylhydantoin and 3.5 parts by weight of solid potassium hydroxide were heated to 150°C and 300 parts by weight of ethylene oxide were introduced over a period of 30 hours. The pale brown reaction product obtained had a molecular weight of 1000 and was sufficiently compatible with polyacrylonitrile mixed in dimethylformamide.

Fibres spun from an approximately 25 percent by weight solution of a mixture of 90 percent by weight of polyacrylonitrile and 10 percent by weight of the compound indicated above had a satisfactory surface conductivity sufficient for practical purposes.

Surface resistance:
in fresh fibre: $3 . 10^{10}\Omega$
after 10 washings: $5 . 10^{10}\Omega$.

EXAMPLE 5

Preparation and antistatic action of 3,5,5-Trimethylhydantoin was ethoxylated 15-fold as described in Example 1 to produce a product with a hydroxyl constant of 2.1 percent, corresponding to a molecular weight of ≈810.

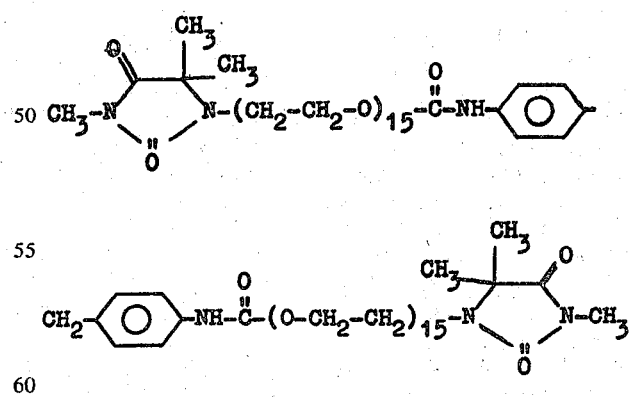

405 parts by weight of the polyether were taken up with 300 parts by volume of dimethylformamide, and a solution of 65 parts by weight of diphenylmethane-4,4'-diisocyanate in 200 parts by volume of dimethylformamide was added dropwise at room temperature. The reaction mixture was stirred for 5 hours and then heated to 60°C for 2 hours.

This solution was again used for preparing spinning solutions, in this case containing a) 90 percent by weight of polyacrylonitrile (PAN) and 10 percent by weight of diurethane (DU) and b) 95 percent by weight of PAN and 5 percent by weight of DU, and the solutions were spun to form fibres.

Measurement of the surface resistance yielded the following results (50 percent r.H, 23°C):

| fresh fibre | after 10 washings |
|---|---|
| a) $5 \cdot 10^{10}$ Ω | $4 \cdot 10^{10}$ Ω |
| b) $8 \cdot 10^{10}$ Ω | $9 \cdot 10^{10}$ Ω |

EXAMPLE 6

Preparation and antistatic action of a. n = 8,
b. n = 19 a. 3 parts by weight of sodium methylate (95 percent) were added to 216 parts by weight of 5,5-dimethylhydantoin and heated to 130°–140°C. After displacement of the air with nitrogen, ethylene oxide was introduced into the solid mass with stirring, a yellow, viscous oil being gradually formed. After this had been taken up with 620 parts by weight of oxide, nitrogen was again passed through and the molecular weight was found by determining the hydroxyl number. OH %: 4.2, Mn≈810, n≈8.

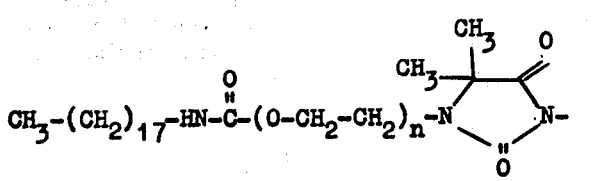

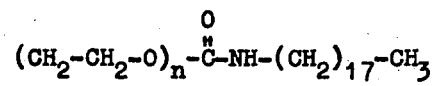

150 parts by weight of stearyl isocyanate were added to 200 parts by weight of this compound under an atmosphere of nitrogen at 100° to 120°C for one hour and the reaction mixture was then stirred for a further 4 to 5 hours. The product was taken up with 380 g of dimethylformamide at room temperature and stirred until it was almost completely dissolved. It was then filtered to remove a slight residue (5 parts by weight) and used to prepare a solution in dimethylformamide which, based on the solids content, consisted of 90 percent by weight of polyacrylonitrile (K-value 84) and 10 percent by weight of the adduct described above and which had a viscosity of 280 poises (85°C).

The surface resistance of threads which had been produced from this solution and stretched by 1:3.8 was found to be $4 \cdot 10^{10}$ Ω in the fresh threads and $6 \cdot 10^{10}$ Ω in threads which had been washed 10 times with an alkaline detergent.

b. 5,5-Dimethylhydantoin was ethoxylated by the method described under a) until the molecular weight had increased to ≈ 1860. 465 Parts by weight of this polyethylene oxide were reacted with 150 parts by weight of stearylisocyanate at 100° to 120°C as described above to produce a diurethane which contained polyethylene oxide units and after this had been left to react for a further 5 hours at 110°C it was used to prepare solutions in dimethylformamide which had the following composition based on the solids content:

1. 90 percent by weight of polyacrylonitrile (K-value 84) and 10 percent by weight of diurethane;
2. 95 percent by weight of polyacrylonitrile and 5 percent by weight of adduct. The solutions were then spun dry.

The surface resistance of the fibres (Ω, 50 percent r.H., 23°C) was found to be as follows:

| fresh fibres | after 10 washings |
|---|---|
| 1. $2 \cdot 10^{10}$ Ω | $2 \cdot 10^{10}$ Ω |
| 2. $8 \cdot 10^{10}$ Ω | $10^{11}$ Ω |

EXAMPLE 7

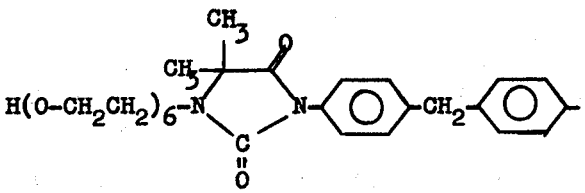

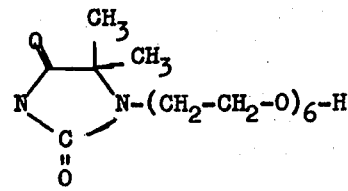

70 parts by weight of 4,4'-bis-[5'',5'''-dimethylhydantoinyl-(3'')]-diphenylmethane and 1 part by weight of solid potassium hydroxide were mixed with 250 parts by weight of glycol carbonate and carefully heated to 150°C while nitrogen was passed through. The reaction mixture was then stirred for 15 hours at this temperature, carbon dioxide being liberated. 85 Parts by weight of volatile constituents were then evaporated off under a high vacuum (0.9 mm) at 120° to 130°C.

The tough, pale brown residue was soluble in dimethyl formamide and insoluble in water and, when mixed to an extent of 10 percent by weight of polyacrylonitrile in dimethylformamide, it yielded a homogeneous, clear, colourless solution which was spun to form threads.

The surface resistance of the fibres was found to be $8 \cdot 10^{10}$ Ω in fresh fibres and $9 \cdot 10^{10}$ Ω after 10 washings.

EXAMPLE 8

Antistatic action of

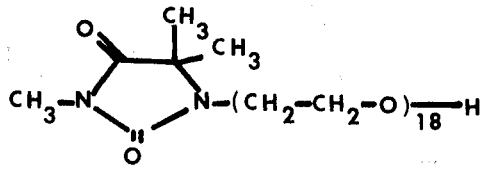

9 as antistatic agent used for polyamides 2 percent by weight of this polyethoxylated 3,5,5-trimethylhydantoin were melted and then applied to heated nylon-6-granulate. The homogeneous melted mixture was spun from an extruder and the resulting threads were stretched. Their surface resistance was found to be $8 \cdot 10^{10} \Omega$ in the fresh threads and $10^{11} \Omega$ after 10 washings.

EXAMPLE 9

Antistatic action of used in polyamides.

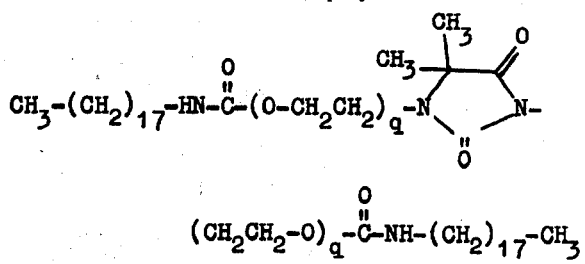

1 percent by weight of a bis-urethane of diethoxylated 5,5-dimethylhydantoin prepared as described in Example 6 was incorporated with a polyamide-6 melt in an extruder and extruded to form cables which were then granulated.

The homogenised granulate was then processed in a chip rolling mill to produce fibres with a titre of 4 dtex.

The following results were obtained from measuring the electric surface resistance:
fresh fibres: $7 \cdot 10^{10}$,
after 10 washings: $8 \cdot 10^{10}$.

We claim:
1. A fiber, thread or foil of a synthetic polyacrylonitrile polymer with permanent antistatic properties, which contains 0.5–15 percent, by weight of the total, of polyethers containing hydantoin rings as represented by the formula

X - (OC$_n$H$_{2n}$)$_p$ - (OC$_m$H$_{2m}$)$_q$ - Hyd - R' in which
X represents hydrogen or the group

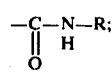

Hyd represents a bivalent group of the formula

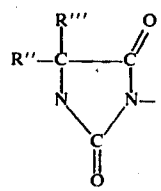

R represents a C$_{1-18}$-alkyl, cycloalkyl, aryl, aralkyl or alkaryl group or halogen alkyl, NO$_2$ or CN derivatives thereof;
R' has the meaning given for R or represents the group -(C$_m$H$_{2m}$O)$_q$-(C$_n$H$_{2n}$O)$_p$-X;
R'' and R''' represents a C$_{1-4}$ alkyl or aryl group or together represent a C$_{5-6}$ cycloalkyl group;
n and m represent an integer or from 2 to 6; and
p and q represent O or an integer of from 1 to 50, and at least p or q > O.

10

2. A fiber, thread, or foil as described in claim 1 wherein the polyacrylonitrile polymer contains the compound

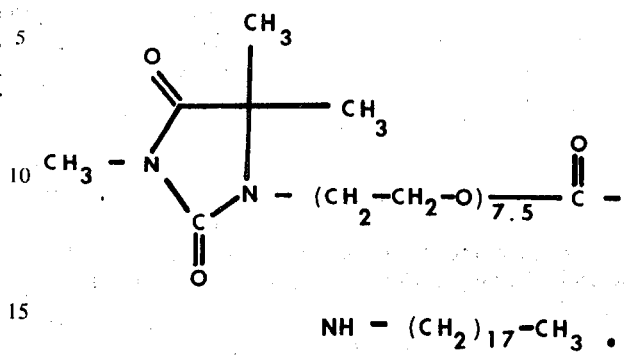

3. A fiber, thread or foil as described in claim 1 wherein the polyacrylonitrile polymer contains the compound

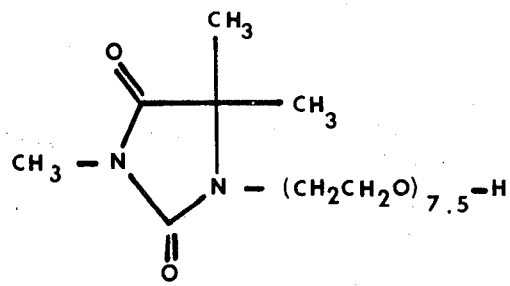

4. A fiber, thread or foil as described in claim 1 wherein the polyacrylonitrile polymer contains the compound

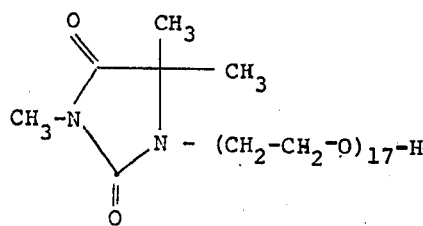

5. A fiber, thread or foil as described in claim 1 wherein the polyacrylonitrile polymer contains the compound

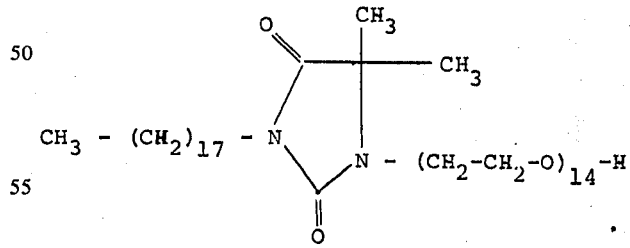

6. A fiber, thread or foil as described in claim 1 wherein the polyacrylonitrile contains the compound

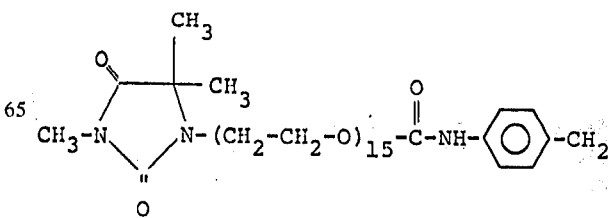

—Continued
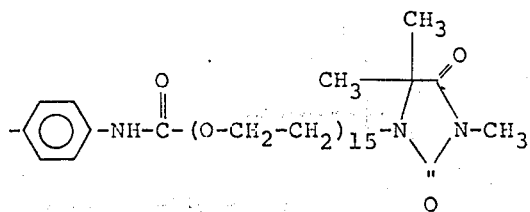
7. A fiber, thead, or foil as described in claim 1 wherein the polyacrylonitrile contains the compound
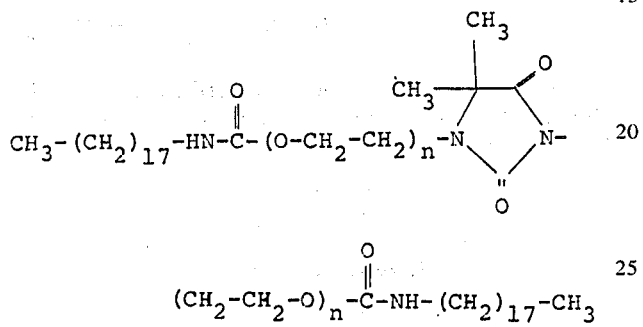
where n is 8 or 19.
8. A fiber, thread, or foil as described in claim 1 wherein the polyacrylonitrile contains the compound
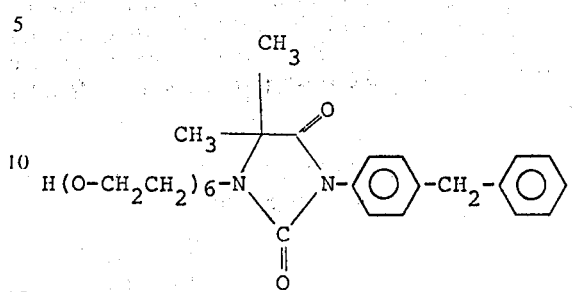
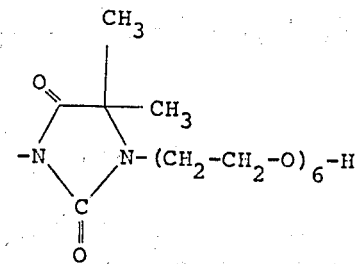
* * * * *

UNITED STATES PATENT OFFICE
CERTIFICATE OF CORRECTION

Patent No. 3,928,298     Dated December 23, 1975

Inventor(s) Gerhard Dieter Wolf et al.

It is certified that error appears in the above-identified patent and that said Letters Patent are hereby corrected as shown below:

Column 1, line 46, "on" should read -- or --.

Signed and Sealed this

Thirty-first Day of May 1977

[SEAL]

Attest:

RUTH C. MASON
*Attesting Officer*

C. MARSHALL DANN
*Commissioner of Patents and Trademarks*